Figure 4:
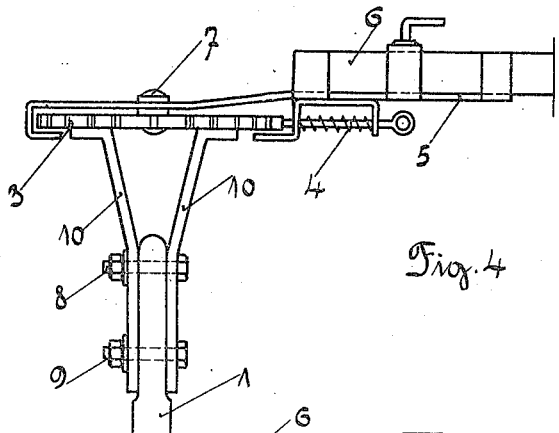

L. SESSLER.
FRONT FRAME FOR CULTIVATORS.
APPLICATION FILED JAN. 14, 1914.
1,161,163.
Patented Nov. 23, 1915.
3 SHEETS—SHEET 1.
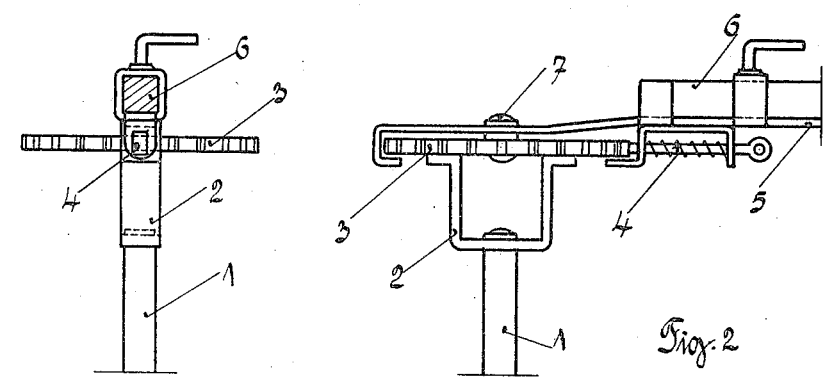
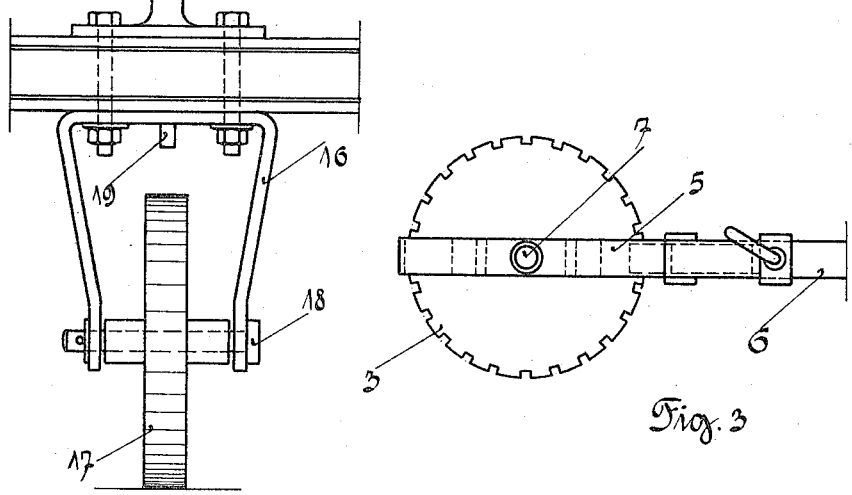

L. SESSLER.
FRONT FRAME FOR CULTIVATORS.
APPLICATION FILED JAN. 14, 1914.

1,161,163.

Patented Nov. 23, 1915.
3 SHEETS—SHEET 2.

L. SESSLER.
FRONT FRAME FOR CULTIVATORS.
APPLICATION FILED JAN. 14, 1914.
1,161,163.
Patented Nov. 23, 1915.
3 SHEETS—SHEET 3.
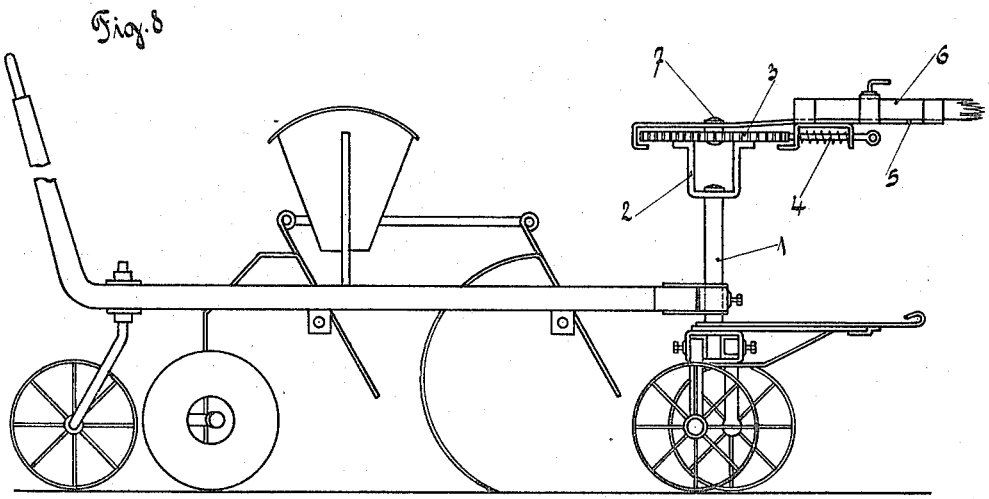
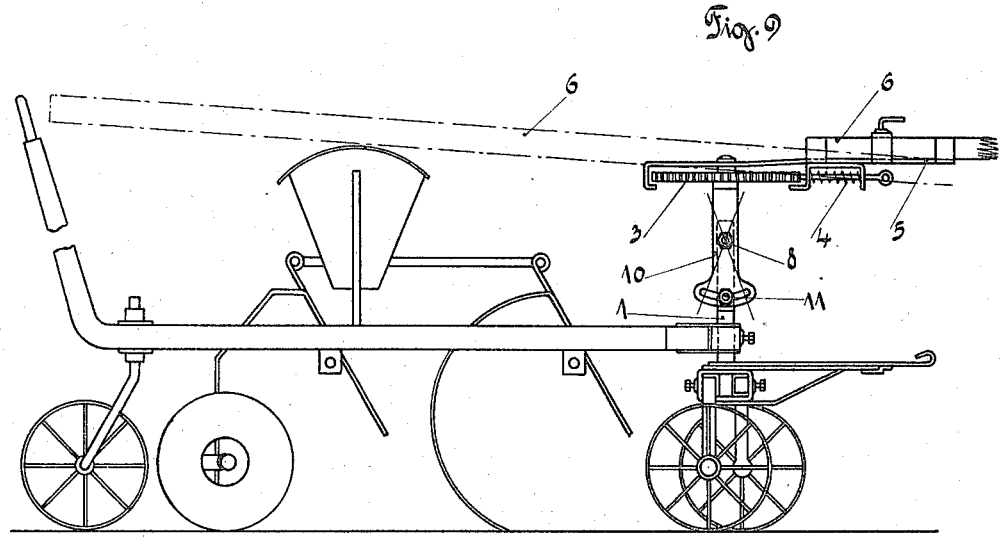

UNITED STATES PATENT OFFICE.

LEONHARDT SESSLER, OF BOTTENWEILER, NEAR ZUMHAUS, GERMANY.

FRONT FRAME FOR CULTIVATORS.

1,161,163.  Specification of Letters Patent.  Patented Nov. 23, 1915.

Application filed January 14, 1914. Serial No. 812,060.

*To all whom it may concern:*

Be it known that I, LEONHARDT SESSLER, a subject of the German Emperor, and a resident of Bottenweiler, near Zumhaus, Bavaria, Germany, have invented an Improved and Novel Front Frame for Cultivators, of which the following is a specification.

The weight of a cultivator to which a drill-barrow is attached is increased by this addition to such an extent that the known steering devices prove insufficient for perfectly accurate steering, especially upon hilly or inclined ground, since they do not allow the adjustment of the pole in any desired inclination to the longitudinal direction of the cultivator in order to cause the draft animals to go always in the furrows or in the center between the plant rows. The laterally extending steering devices provided on the known machines are rigidly connected with the frame, and where a steering device for steering from the rear exists, it consists nearly always of several parts.

According to the present invention, a rod attached by means of a U-shaped angular support and a spring pressed catch to a recessed disk may be rotated upon this latter, this rod being also longitudinally slidable, after a set screw has been unscrewed; said rod may be adjusted in any desired angle with respect to the cultivator, being then employed either as a pole for the same, or for steering the machine from the rear, or serving, if it is affixed at its center part, for steering the machine from the side. To allow of adjusting the front end of the pole vertically as desired with regard to the position of the fulcrum, if such adjustment should become necessary, the supports of the recessed disk are pivotally attached by means of supporting screws, to the vertical front frame bar. To allow of employing this arrangement also in connection with a one-horse cultivator, a thill may be pivotally connected to the pole- or thill-carrier by means of a cross-bar, and in a similar way also a one-wheeled front frame may be made use of, in connection with the double U-shaped supporting girders, preferably in such a manner, that the counter plate of the vertical front frame bar, which is provided with a guide-pivot extending to the draft hook, is exchanged for a bow within which one of the two front wheels is arranged by means of a supporting pivot.

Figure 5:
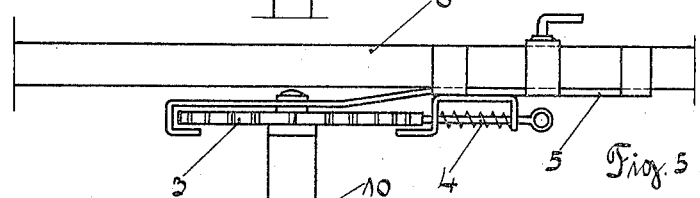
Figure 6:
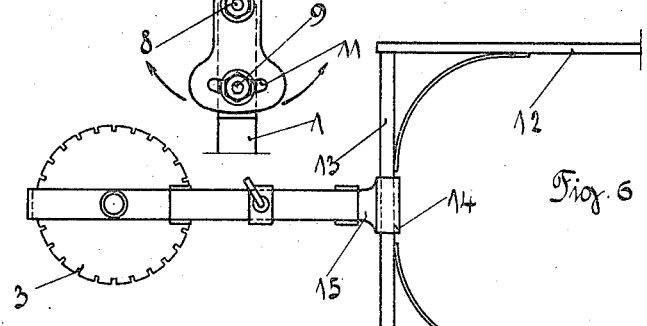
Figure 7:
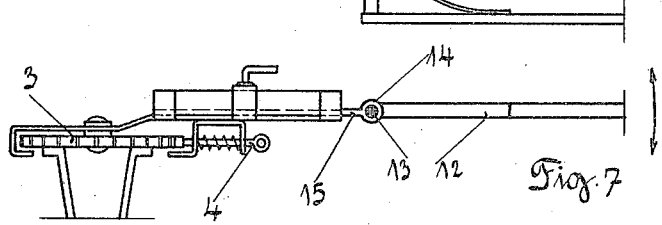

In order to make my invention more clear, I refer to the accompanying drawings, in which similar numerals denote similar parts throughout the several views, and in which:

Figure 1 is a front view of the front frame, a part of the bar 1 being broken away and the pole 6 being shown in section; Fig. 2 is a side view of the parts shown in the upper half of Fig. 1; Fig. 3 is a plan of the parts shown in the upper half of Fig. 2; Fig. 4 is a view similar to Fig. 2, showing a slightly modified form of construction; Fig. 5 is a similar representation showing the lower parts of Fig. 4 turned in an angle of 90°; Fig. 6 is a representation similar to Fig. 3, drawn on a smaller scale and showing the recessed disk combined with a thill; and Fig. 7 is a side view of the parts shown in Fig. 6. Figs. 8 and 9 are side views of a cultivator constructed according to the present invention.

Referring to Figs. 1–3 the vertical bar 1, which is rigidly secured to the center part of the front frame, has affixed to its upper end a U-shaped bow 2, which is connected with a disk 3 coöperating with a spring-pressed catch 4 attached to a supporting bar 5 which is pivoted at 7 to the center of said recessed disk and is provided with means for being coupled with the pole 6 which thus may be laterally turned into any position with respect to the disk 3 and may be secured in that position by the catch 4.

In the form of construction shown in Figs. 4 and 5 the bow 2 is replaced by two angularly bent bars 10 which are connected with the bar 1 by means of a bolt 8 upon which the bars may be turned so as to bring the disk 3 and the other upper parts, including the pole 6, into an inclined position. In other words: the pole 6 can be adjusted not only horizontally but also vertically. The lower ends of the bars 10 are broadened and have each a slot 11 through which extends a bolt 9 also supported by the bar 1. This bolt serves for securing the bars 10 in their position after adjustment.

In the form of construction shown in Figs. 6 and 7 which is intended for a one-horse machine, the thill 12 is attached by means of a cross bar 13 to the sleeve 14 which forms the front end of the thill holder 15. This latter may be at liberty connected with or disconnected from the recessed disk, that is to say, it may be replaced, if desired or necessary, by a pole as required for a two-horse machine or cultivator respectively. In a similar manner, the two-wheeled front frame customary with cultivators may be exchanged for a one-wheeled one as shown in Fig. 1. This is effected in a very simple manner by merely substituting the bow 16 for the counter plate of the front frame bar 1, the said bow serving as holder for the axle 18 of the wheel 17, as shown. To the horizontal upper part of the bow 16 is affixed the known guide pivot 19 for the draft hook.

Mention may be still made of the fact that Fig. 4 shows the pole arranged as a draft part, whereas Fig. 5 shows it employed as hand bar.

The operation of the device will become apparent from Figs. 8 and 9 which show the pole 6 in its normal position and indicate in Fig. 9 in dotted lines its position for use as a hand steering device where it is displaced in its bearing 5 in such a manner that it comes within reach of the handles arranged at the cultivator frame. The pole is guided over the seed box and is adjusted by means of the screws 8 and 11 in inclined position.

Having now described my invention, what I desire to secure by Letters Patent of the United States is:

1. In a front frame for cultivators, the combination, with a recessed disk secured to the vertical front frame bar, of a pole- or thill-holder attached to the center of said disk and adapted to be turned upon it, and a spring pressed catch for coupling the disk and the holder in any desired position of the latter.

2. In a front frame for cultivators, the combination, with a recessed disk secured to the vertical front frame bar, of a pole-holder adapted to be turned upon the same; a pole arranged in said holder and adapted to be displaced in the same; and a spring pressed catch for coupling the disk and the holder with the pole in any position of this latter.

3. In a front frame for cultivators, the combination, with a recessed disk, supports for the same, a front frame bar holding said supports; of a pole-holder attached to the center of said disk, a bolt held by said bar and serving as fulcrum for the support slots in the lower ends of the latter; another bolt also held by the front frame bar and extending through said slots; and a spring pressed catch for coupling the disk and the holder in any desired position.

In testimony whereof I affix my signature in presence of two witnesses.

LEONHARDT SESSLER.

Witnesses:
  OSCAR BOCK,
  GEORG HIBNER.

Copies of this patent may be obtained for five cents each, by addressing the "Commissioner of Patents, Washington, D. C."